US010505949B2

(12) United States Patent
Zhang

(10) Patent No.: US 10,505,949 B2
(45) Date of Patent: Dec. 10, 2019

(54) BLOCKCHAIN-BASED SYSTEM, AND ELECTRONIC APPARATUS AND METHOD IN THE SYSTEM

(71) Applicant: Sony Corporation, Tokyo (JP)

(72) Inventor: Zhihui Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 124 days.

(21) Appl. No.: 15/450,126

(22) Filed: Mar. 6, 2017

(65) Prior Publication Data

US 2017/0346833 A1 Nov. 30, 2017

(30) Foreign Application Priority Data

May 27, 2016 (CN) .......................... 2016 1 0364591

(51) Int. Cl.
| | | |
|---|---|---|
| *H04L 29/06* | (2006.01) | |
| *G06F 16/951* | (2019.01) | |
| *H04L 29/08* | (2006.01) | |
| *G06Q 30/06* | (2012.01) | |
| *H04L 9/32* | (2006.01) | |

(52) U.S. Cl.
CPC .......... *H04L 63/123* (2013.01); *G06F 16/951* (2019.01); *G06Q 30/0601* (2013.01); *H04L 9/3218* (2013.01); *H04L 9/3239* (2013.01); *H04L 9/3247* (2013.01); *H04L 63/0428* (2013.01); *H04L 67/10* (2013.01); *H04L 2209/38* (2013.01); *H04L 2209/56* (2013.01)

(58) Field of Classification Search
CPC . H04L 63/123; H04L 9/3247; H04L 63/0428; H04L 67/10; H04L 9/3236; H04L 9/3218; H04L 2209/56; H04L 2209/38; H04L 9/3239; G06Q 30/0601; G06F 17/30864; G06F 16/951
See application file for complete search history.

(56) References Cited

U.S. PATENT DOCUMENTS

| | | | |
|---|---|---|---|
| 9,298,806 B1 * | 3/2016 | Vessenes .............. | G06Q 20/065 |
| 2015/0206106 A1 * | 7/2015 | Yago .................. | G06Q 20/0658 |
| | | | 705/68 |

(Continued)

OTHER PUBLICATIONS

Xu et al., "The Blockchain as a Software Connector", Apr. 2016, IEEE, pp. 182-191. (Year: 2016).*

*Primary Examiner* — Matthew Smithers
(74) *Attorney, Agent, or Firm* — Xsensus LLP

(57) ABSTRACT

There is disclosed a blockchain-based system, and an electronic apparatus and a method in the system. The electronic apparatus at a control node end includes a processor configured to: verify, in response to an ownership declaration for a new object that is first introduced from a to-be-verified node in the system, the ownership declaration; and sign, in a case that the verification is successful, the ownership declaration to be returned to the to-be-verified node, so that the signed ownership declaration is verified by other nodes in the system and a record regarding the ownership declaration is added to the blockchain. According to the embodiment of the disclosure, it is possible to verify the newly introduced object in the blockchain-based system without binding with a cipher coin, while maintaining a peer-to-peer architecture of the blockchain-based system.

13 Claims, 8 Drawing Sheets

(56) References Cited

U.S. PATENT DOCUMENTS

| | | | | |
|---|---|---|---|---|
| 2016/0080156 A1* | 3/2016 | Kaliski, Jr. | ............ | H04L 9/3247 |
| | | | | 713/176 |
| 2016/0253523 A1* | 9/2016 | Kroonmaa | .............. | G06F 21/30 |
| | | | | 726/26 |
| 2016/0300234 A1* | 10/2016 | Moss-Pultz | ........ | G06Q 20/3829 |
| 2016/0335609 A1* | 11/2016 | Jenkins | .............. | G06Q 20/1235 |
| 2016/0364787 A1* | 12/2016 | Walker | ................ | G06Q 30/0635 |
| 2017/0005804 A1* | 1/2017 | Zinder | .................. | H04L 9/3247 |
| 2017/0091750 A1* | 3/2017 | Maim | .................... | H04L 9/3236 |
| 2017/0214699 A1* | 7/2017 | Johnsrud | ............... | H04L 63/126 |
| 2017/0237554 A1* | 8/2017 | Jacobs | .................. | H04L 9/0819 |
| | | | | 713/171 |
| 2017/0244720 A1* | 8/2017 | Kurian | .................. | H04L 63/105 |
| 2017/0244757 A1* | 8/2017 | Castinado | ............... | H04L 63/20 |
| 2017/0295023 A1* | 10/2017 | Madhavan | .............. | H04L 9/3247 |
| 2017/0317997 A1* | 11/2017 | Smith | .................... | H04L 9/0861 |
| 2017/0323392 A1* | 11/2017 | Kasper | ................... | G06Q 40/12 |
| 2017/0344580 A1* | 11/2017 | King | ................ | G06F 17/30097 |
| 2018/0068280 A1* | 3/2018 | Micali | .................... | G06Q 20/02 |
| 2018/0075028 A1* | 3/2018 | Ruschin | .................. | G06Q 10/00 |
| 2018/0302417 A1* | 10/2018 | Wilson | .................. | G06F 21/645 |
| 2019/0019183 A1* | 1/2019 | Karame | ............. | G06Q 20/3829 |

* cited by examiner

BLOCKCHAIN-BASED SYSTEM, AND ELECTRONIC APPARATUS AND METHOD IN THE SYSTEM

FIELD

The present disclosure relates to the field of information security, and in particular to a blockchain-based system, and an electronic apparatus and a method in the system, which enable all nodes to reach a consensus on a new object that is first introduced, so as to add a record regarding the new object to the blockchain, without relying on a cipher coin.

BACKGROUND

The blockchain, as a reliable distributed database system collectively maintained by all participating nodes in a decentralized and trustless manner, is characterized by its unchangeability and unforgeability. The blockchain consists of a series of blocks which are generated with a cryptography method. Each of the blocks contains a hash value of a previous block, and the blockchain is formed by connecting from a genesis block to a current block. It is ensured that each block is generated after a previous block in a chronological order, otherwise the hash value of the previous block is unknown.

At present, applications on the Bitcoin-oriented blockchain (such as intelligent contract and intelligent asset) are bound with cipher coins on a blockchain platform. In the Bitcoin blockchain system, new coins are introduced by mining. In a non-token blockchain application platform, if all of nodes in the system are equal to one another, how to verify authenticity and validity of an object that is first introduced, such as a concept, intelligent asset and digital asset is an issue. The blockchain as a distributed consensus platform may be served as a trust transferring chain under the premise that creditability of source data (i.e., data that is first introduced) can be ensured. For example, new Bitcoins are given to miners as awards, and all transactions related to the new Bitcoins thereafter may be finally traced back to the initial stage of awarding. However, in the non-token blockchain platform, no effective solution regarding how to make all of the nodes reach a consensus on the data that is first introduced has been proposed.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problem, an object of the present disclosure is to provide a new architecture of a blockchain-based system, which enables all nodes in the system to reach a consensus on a new object that is first introduced to ensure authenticity and validity of the new object, without binding with the cipher coin such as the Bitcoin.

An electronic apparatus at a control node end in a blockchain-based system is provided according to an aspect of the present disclosure. The electronic apparatus includes a processor configured to: verify, in response to an ownership declaration for a new object that is first introduced from a to-be-verified node in the system, the ownership declaration; and sign, in a case that the verification is successful, the ownership declaration to be returned to the to-be-verified node, so that the signed ownership declaration is verified by other nodes in the system and a record regarding the ownership declaration is added to the blockchain.

According to a preferred embodiment of the present disclosure, the processor may be further configured to verify the ownership declaration according to a zero-knowledge proof protocol.

According to another preferred embodiment of the present disclosure, the processor may be further configured to verify, based on an identifier in the ownership declaration, the ownership declaration according to the zero-knowledge proof protocol.

According to another preferred embodiment of the present disclosure, the processor may be further configured to verify the ownership declaration using an external database.

According to another preferred embodiment of the present disclosure, the external database may include one or more of a centralized data service platform, a cloud computing platform and other blockchain platforms.

According to another preferred embodiment of the present disclosure, the processor may be further configured to verify a signature of the to-be-verified node, and sign the ownership declaration in a case that the verification is successful.

According to another preferred embodiment of the present disclosure, the electronic apparatus may operate as a control node and further include: a communication unit configured to perform data transmission and reception operations.

An electronic apparatus at a to-be-verified node end in a blockchain-based system is further provided according to another aspect of the present disclosure. The electronic apparatus includes a processor configured to: generate an ownership declaration for a new object that is first introduced to be broadcast in the system, so as to be verified by a control node in the system; and generate, based on a signature from the control node, a credential regarding the ownership declaration to be broadcast in the system so as to be verified by other nodes in the system, so that a record regarding the ownership declaration is added to the blockchain.

A blockchain-based system is further provided according to another aspect of the present disclosure. The system includes: a to-be-verified node configured to: generate an ownership declaration for a new object that is first introduced to be broadcast in the system, and generate, based on a signature from a control node, a credential regarding the ownership declaration to be broadcast in the system; the control node configured to: verify the ownership declaration in response to the ownership declaration, and sign the ownership declaration to be returned to the to-be-verified node in a case that the verification is successful; and other nodes configured to verify the credential in response to the credential broadcast by the to-be-verified node, so that a record regarding the ownership declaration is added to the blockchain.

Methods in a control node and a to-be-verified node in the blockchain-based system corresponding to the electronic apparatuses described above are further provided according to other aspects of the present disclosure.

Computer program codes and a computer program product for implementing the above methods according to the present disclosure, and a computer readable storage medium on which the computer program codes implementing the above methods according to the present disclosure are recorded are further provided according to other aspects of the present disclosure.

According to the embodiments of the present disclosure, in the blockchain-based system, it is possible to enable all nodes in the system to reach a consensus on an object which is introduced newly so as to add a record regarding the object to the blockchain, without binding with the cipher coins.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1A:
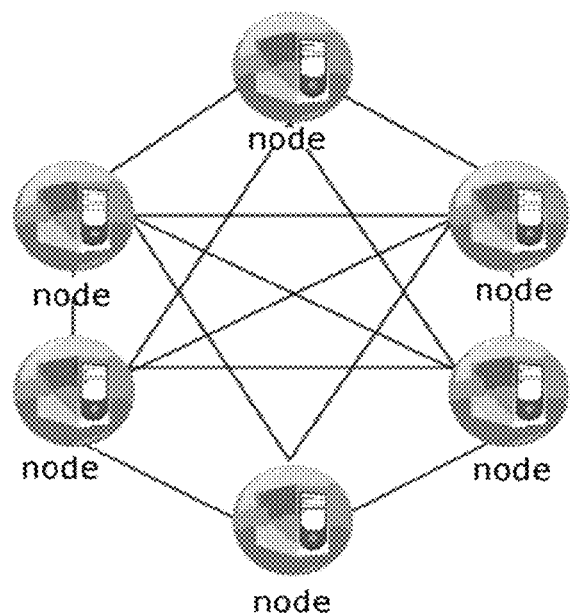
FIGS. 1A to 1D are schematic diagrams showing architecture examples of existing distributed systems.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Figure 1B:
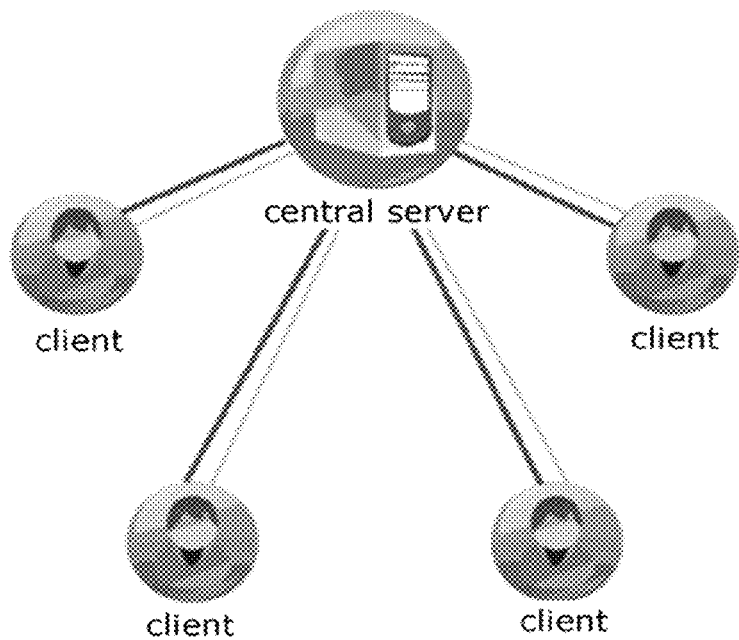
Figure 1C:
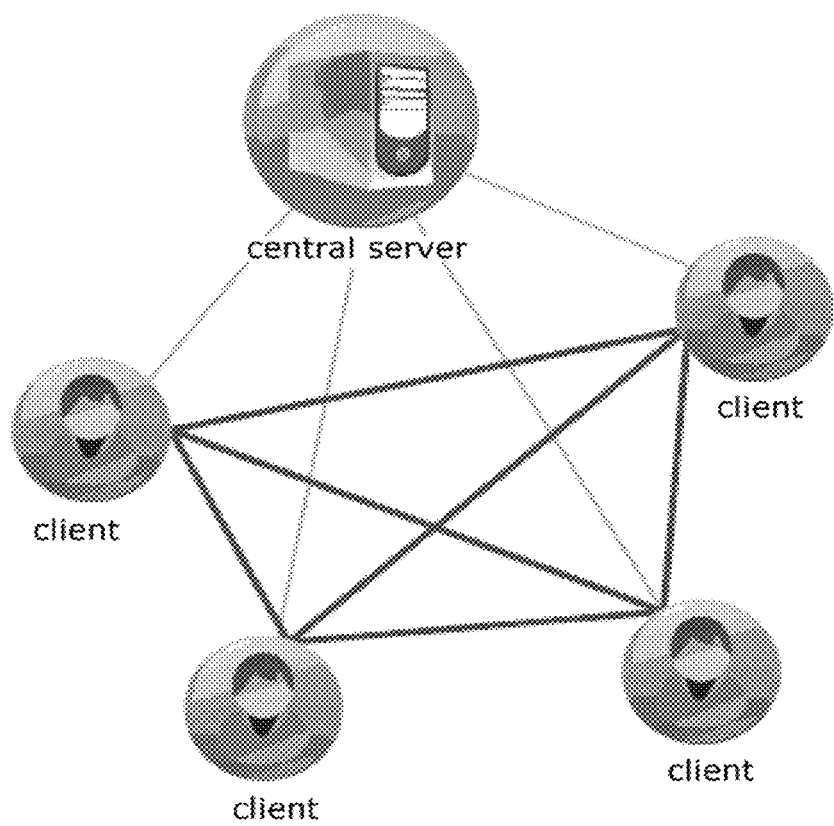
Figure 1D:
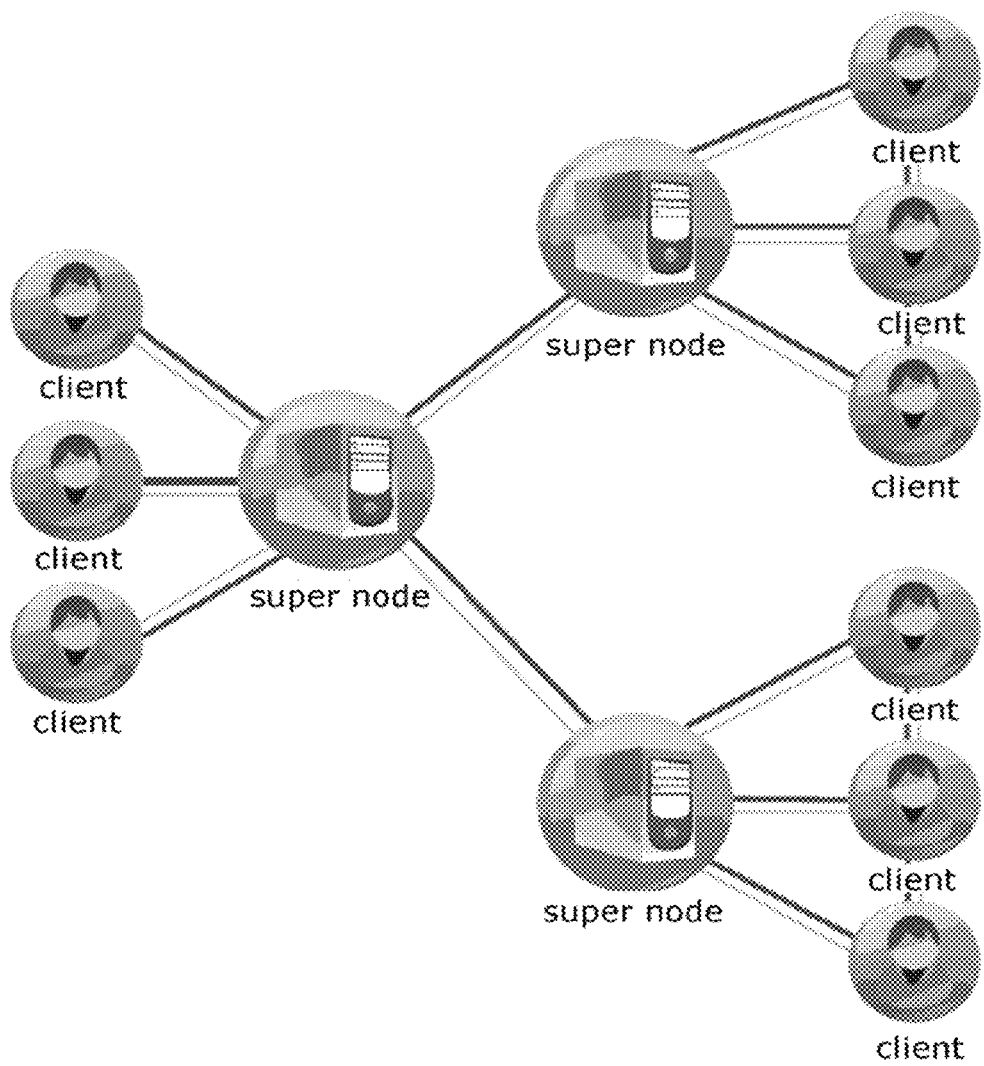
Figure 2:
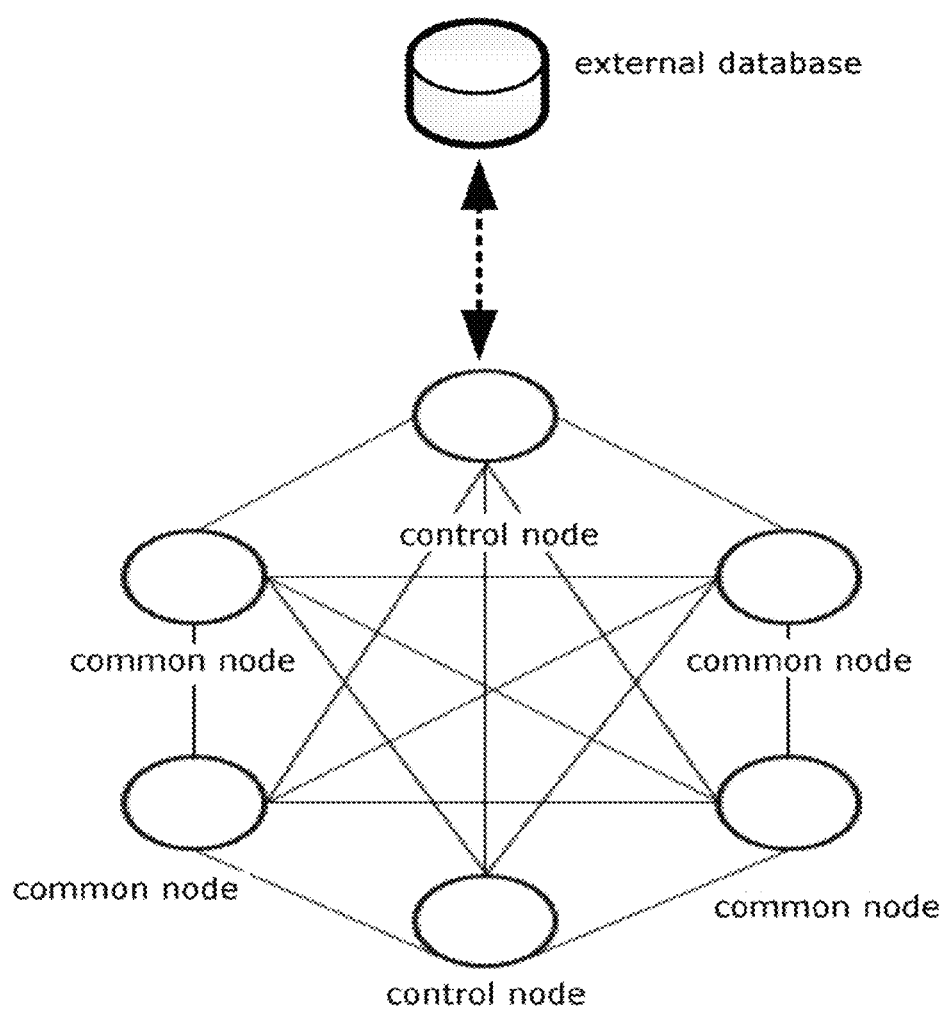
FIG. 2 is a schematic diagram showing an architecture example of a blockchain-based system according to an embodiment of the present disclosure.

The principle and overall concept of the present disclosure are briefly described in conjunction with FIG. 1A to FIG. 2 before specifically describing the embodiments of the present disclosure.

An existing blockchain-based system is actually a Peer-to-Peer (P2P) network platform, i.e., all participating nodes in the blockchain-based system are equal. P2P can be simply defined as sharing computer resources and services via direct exchange. In the P2P network environment, thousands of computers connected to one another are equal, and generally, the whole P2P network does not rely on a dedicated centralized server. The P2P system is a topology structure of a distributed system as shown in FIG. 1A. In addition to the P2P system, the distributed system further includes a centralized system as shown in FIG. 1B, a hybrid P2P system as shown in FIG. 1C and a P2P system having a super node (super peer) structure as shown in FIG. 1D. In these distributed systems, some of the nodes, such as a central server or a super node respectively shown in FIGS. 1C and 1D, may have additional functions such as controlling and verifying and the like in addition to functions of common nodes, so as to achieve operations such as initialized configuration for the system and the like.

As described above, in the existing blockchain-based system, verification for credibility and authenticity of an object that is first introduced must be implemented depending on the cipher coin. For example, in a Bitcoin blockchain-based system, a way for registering a determined ownership in the Bitcoin blockchain is referred to as color coin or coloured coin. The coloured coin is a meta protocol that information is stored on a few Bitcoins. A "coloured" coin is a certain amount of Bitcoins which are reused to represent another kind of asset. For example, if a banknote of one dollar is stamped with a seal on which "This is a certificate for a stock right of a certain company" is written, then the banknote of one dollar is not only a currency in circulation, but also the certificate for stock right. This principle also applies to the coloured coin, that is, converting a specific transaction of a small amount of Bitcoins to a certificate to represent another asset. The called "coloured" is only a metaphor, which does not represent a literal meaning thereof, and refers to a manner of adding attributes.

However, for a non-token blockchain platform, it is impossible to register the ownership in the blockchain-based system with for example the "coloured coin" described above. Based on the architecture of the existing distributed system, if the P2P system, the hybrid P2P system and the P2P system having the super node structure can be combined, that is, if some of the nodes can serve as the super nodes to verify the credibility and authenticity of an object that is first introduced by including an additional function, in addition to running and maintaining the blockchain (including computation and generation of a new block) as other common nodes, it is possible to get rid of rely on the cipher coin while maintaining the peer-to-peer architecture of the blockchain-based system.

The present disclosure is proposed based on such concept. FIG. 2 shows an architecture example of a blockchain-based system according to an embodiment of the present disclosure. As shown in FIG. 2, different from the P2P architecture of the existing blockchain-based system in which all of the nodes are completely equal, the architecture of the system according to the embodiment includes two types of nodes, a control node (corresponding to the super node in the P2P system having a super peer architecture) and a common node. In a case where a new object is first introduced to the common node, the control node may verify an ownership for the new object of the common node, including for example qualification verification, digital asset verification, education qualification verification and the like, while in normal times, the control node runs and maintains the blockchain like the common node. In addition, as shown in FIG. 2, in some cases, the control node may be further connected to an external database to achieve the verification. The number of the control nodes may be one or more.

In the following, specific implementations of the embodiments of the present disclosure are described in detail in conjunction with the above principle of the present disclosure.

Figure 3:
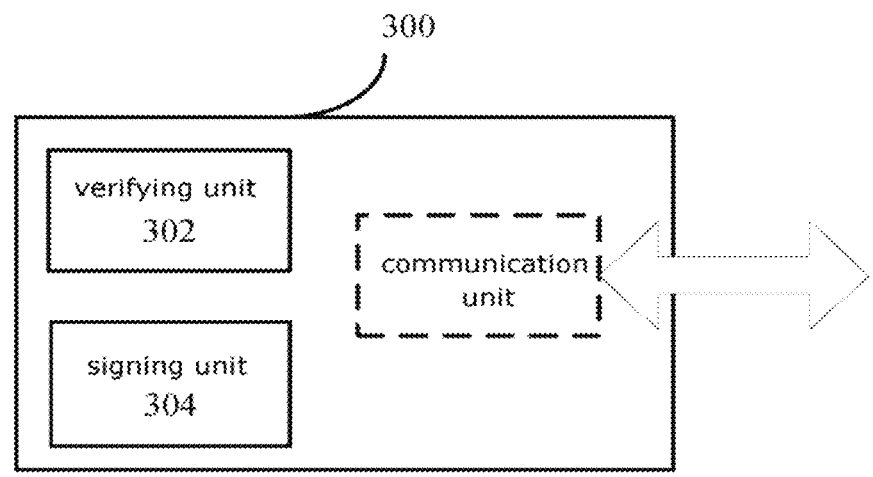
FIG. 3 is a block diagram showing a functional configuration example of an electronic apparatus at a control node end in a blockchain-based system according to an embodiment of the present disclosure.

FIG. 3 is a block diagram showing a functional configuration example of an electronic apparatus at a control node end in a blockchain-based system according to an embodiment of the present disclosure. The electronic apparatus may be arranged in the control node or may operate as the control node.

As shown in FIG. 3, an electronic apparatus 300 according to the embodiment may include a verifying unit 302 and a signing unit 304. It should be noted that, function units described herein are logical function modules divided based on only specific functions respectively achieved by the function units, and are not intended to limit specific implementations. In an actual implementation, the above function units may be implemented as independent physical entities or may be implemented as a single entity (such as a processor (such as CPU or DSP or the like), an integrated circuit and the like).

The verifying unit 302 may be configured to verify, in response to an ownership declaration for a new object that is first introduced from a to-be-verified node in the system, the ownership declaration.

Specifically, if a user declares a certain ownership using a certain client node, then the client node can be called as the to-be-verified node, i.e., the called common node. The to-be-verified node may broadcast the ownership declaration to all control nodes in the system via a broadcast channel or based on a list of addresses (such as IP addresses) of all the nodes in the system.

The verifying unit 302 of the control node having received the ownership declaration may verify the ownership declaration. For example, if content about the ownership is public, the user may upload an electronic material related to the ownership (such as a house property certificate, a diploma and a vehicle ownership certificate or the like) to indicate his/her ownership. In this case, the verifying unit 302 may verify the authenticity of the uploaded electronic material with an external database, so as to verify the validity of the ownership. The external database here may include for example one or more of a centralized data service platform, a cloud computing platform and other blockchain-based platforms.

It should be noted that, an interface between the control node and the external database may be a built-in application program interface (API) when the system sets the control node, or may be an additionally configured API when the user downloads and installs a client program of the control node.

Alternatively, if the content related to the ownership may be not public and need privacy protection based on a predetermined agreement or based on an identifier in the received ownership declaration, then the verifying unit 302 may further interact with the to-be-verified node with a zero-knowledge proof protocol, so as to verify the ownership declaration. In the following, the principle of the zero-knowledge proof protocol is described briefly.

The zero-knowledge proof was proposed by Goldwasser et al at the beginning of 1980s. The zero-knowledge proof indicates that a prover can make a verifier believe that an assertion is correct without providing any useful information to the verifier. The zero-knowledge proof is substantively a protocol related to two or more parties, that is, a series of steps adopted by the two or more parties to complete a task. The prover proves to the verifier and makes the verifier believe he/she knows or owns a certain message, but can not leak to the verifier any information regarding the message to be proved during the proving.

In the following, a way in which the ownership declaration is verified according to the zero-knowledge proof protocol is specifically described as an example. According to the zero-knowledge proof protocol, assuming that the ownership declaration is P, an algorithm $f_p(\ )$ for proving the ownership may be generated based on the ownership declaration P, and $f_p^{-1}(\ )$ may be computed. It may be defined that $f_p(\ )$ cannot be deduced from $f_p^{-1}(\ )$ to ensure security.

Then, the control node randomly sends a challenge x to the to-be-verified node, and the to-be-verified node computes $f_p(x)$ and returns a result to the control node. The control node may substitute $f_p(x)$ for calculation. If $f_p^{-1}(f_p(x))=x$, it is proved that the to-be-verified node knows $f_p(\ )$.

In order to ensure the security, the above verifying process may be repeated multiple times. In this case, the control node can confirm that the to-be-verified node does know $f_p(\ )$. Therefore, the ownership declaration P declared by the to-be-verified node is authentic and valid.

It should be noted that, only an exemplary implementation of the zero-knowledge proof protocol is given here. Of course, those skilled in the art can devise of other appropriate implementations based on the principle of the zero-knowledge proof, as long as to-be-verified information can be verified while protecting the privacy of the information.

It can be understood that, the control node can verify not only public information, but also content requiring privacy protection by utilizing the zero-knowledge proof protocol. Practically, it is also conceivable for those skilled in the art that the information requiring privacy protection is verified with other data security protocols other than the zero-knowledge proof protocol.

In addition, preferably, in order to further improve the security, the to-be-verified node may further sign the ownership declaration, so that the control node can verify the ownership declaration is declared by the to-be-verified node. Specifically, in the blockchain-based system, each of the nodes may have one or more identity keys, which may be implemented by a public key cryptography system, in which a pair of keys, i.e. a public key and a private key, is assigned, a signer generates a signature representing the identity thereof with the private key, and a verifier verifies validity of the signature with the public key. These identity keys may be preset in the system or may be generated when the nodes access to the system, and the latter case may be applied in some scenarios of temporarily networking.

As such, the to-be-verified node may broadcast the ownership declaration with its signature being attached, so that the verifying unit 302 may verify the signature with the public key for the to-be-verified node so as to verify that the ownership declaration is declared by the to-be-verified node.

After the verifying unit 302 successfully verifies the ownership declaration and the signature of the to-be-verified node, the signing unit 304 may sign the ownership declaration to indicate the authenticity and validity of the ownership declaration, and return the signature to the to-be-verified node. After receiving the signature from the control node, the to-be-verified node may broadcast its ownership declaration, the signature of the control node and the signature of the to-be-verified node again, thus other nodes in the system may verify the validity of the signature of the control node and register, in a case that the verification is successful, a record related to the ownership declaration, as an initial record, in a next new block to thereby add the record to the blockchain. In this way, when a transaction related to the ownership (such as ownership assignment, ownership transaction or the like) is subsequently executed in the blockchain-based system, it can be traced back to the initial record.

It can be seen that, different from for example the Bitcoin blockchain-based system in which only transaction information is stored, in the blockchain-based system according to the disclosure, a record (such as the record related to the ownership declaration described above) other than the transaction information may be included. In this way, the validity and traceability of all records in the blockchain can be ensured without relying on the cipher coin.

In addition, it should be noted that, the system may include multiple control nodes. In order to improve efficiency, in a case where all of the control nodes are trustable, only a control node which firstly responds needs to interact with the to-be-verified node according to the zero-knowledge proof protocol to realize verification. Practically, for a scenario requiring high security, multiple control nodes are allowed to participate in the verification according to the zero-knowledge proof protocol at the same time. For example, each of the control nodes may generate several challenge messages to be responded by the to-be-verified node.

That is to say, as described above, the system may include multiple control nodes. Based on specific application scenarios and security requirements, the verifying and signing may be completed by a control node which firstly responds, or by some (for example, exceeding half of the number of the control nodes) or all of the control nodes.

Although it has been described above the ownership declaration can be verified with the external database or the zero-knowledge proof protocol, it is conceivable for those skilled in the art that the ownership declaration can be verified in other manners in the data security field, which is not limited herein.

It can be understood that, the above electronic apparatus 300 may be implemented in chip level, or may be implemented in apparatus level by including other external components. For example, the electronic apparatus 300 may, as a whole set, operate as the control node, and the electronic apparatus 300 may further include a communication unit such as a transceiver to perform data transmission and reception operations.

Figure 4:
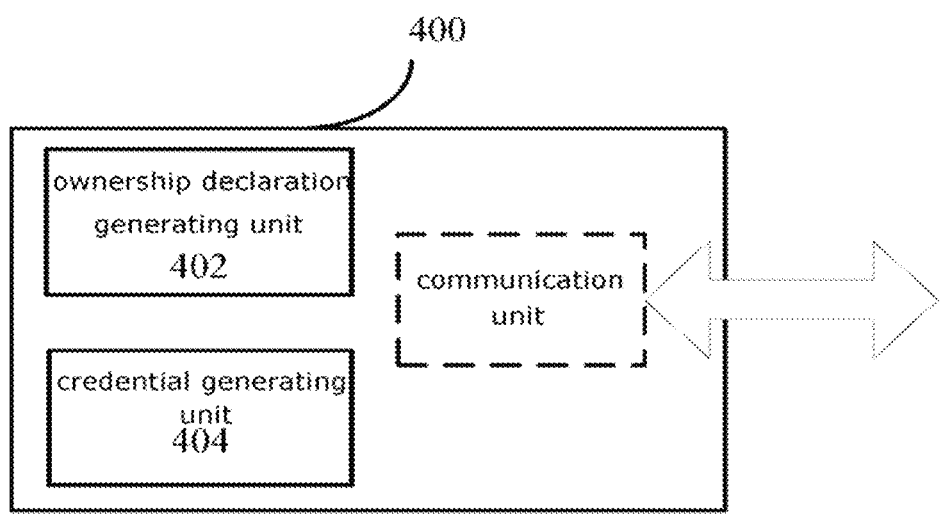
FIG. 4 is a block diagram showing a functional configuration example of an electronic apparatus at a to-be-verified node end in a blockchain-based system according to an embodiment of the present disclosure.

Corresponding to the above embodiment of the control node, a functional configuration example of an electronic apparatus at a to-be-verified node end according to an embodiment of the present disclosure is described below with reference to FIG. 4. FIG. 4 is a block diagram showing a functional configuration example of an electronic apparatus at a to-be-verified node end in a blockchain-based system according to an embodiment of the present disclosure. The electronic apparatus may be arranged in the to-be-verified node or may operate as the to-be-verified node.

As shown in FIG. 4, an electronic apparatus 400 according to the embodiment may include an ownership declaration generating unit 402 and a credential generating unit 404. It should be noted that, function units described herein are logical function modules divided based on only specific functions respectively achieved by the function units, and are not intended to limit specific implementations. In an actual implementation, the above function units may be implemented as independent physical entities or may be implemented as a single entity (such as a processor (such as CPU or DSP or the like), an integrated circuit and the like).

The ownership declaration generating unit 402 is configured to generate an ownership declaration for a new object that is first introduced to be broadcast in the system. For example, as described above, the ownership declaration may be broadcast to the respective control nodes via a broadcast channel or based on an address list of the system. Preferably, the ownership declaration generating unit 402 may sign the ownership declaration with a private key thereof to be broadcast in the system. Thus, all of the control nodes having received the ownership declaration and the signature of the to-be-verified node may verify validity of such information.

Preferably, in a case where information related to the ownership declaration is private, the ownership declaration generating unit 402 may set a specified identifier in the ownership declaration to indicate that the ownership declaration requires privacy protection. Thus, the control node receiving the ownership declaration may initiate, for example, the zero-knowledge proof protocol based on the identifier, to verify the validity of the ownership declaration. Practically, as described above, the control node may interact with the to-be-verified node according to the zero-knowledge proof protocol, which is agreed by the two nodes in advance. In response to the zero-knowledge proof protocol initiated by the control node, the to-be-verified node may interact with the control node with, for example, a challenge/response mechanism, to prove the ownership thereof.

After the control node having successfully verified the ownership declaration and the signature of the to-be-verified node, the control node may return a signature thereof to the to-be-verified node. The credential generating unit 404 may be configured to generate a credential related to the ownership declaration based on the signature of the control node, so as to broadcast the credential in the system. Specifically, the credential generating unit 404 may broadcast the ownership declaration, the signature of the to-be-verified node and the signature of the control node in the system as the credential. Thus, other nodes in the system verify the signature of the control node after receiving the credential, and add, in a case that the verification is successful, a record related to the ownership declaration to the blockchain for other subsequent operations.

It should be noted that, as described above, since the system may include multiple control nodes which are all in duty bound to verify the ownership declaration and return the verification result, based on specific application scenarios, in a case where some or all of the multiple control nodes verify and sign the ownership declaration, when generating the credential related to the ownership declaration, the credential generating unit 404 needs to add all of the received signatures of the control nodes to the credential for being verified by other nodes in the system.

It can be understood that, the above electronic apparatus 400 may be implemented in chip level, or may be implemented in apparatus level by including other external components. For example, the electronic apparatus 400 may, as a whole set, operate as the to-be-verified node, and the electronic apparatus 400 may further include a communication unit such as a transceiver to perform data transmission and reception operations.

It should be noted that, the electronic apparatus 400 described here corresponds to the embodiment of the electronic apparatus 300 at the control node end described with reference to FIG. 3, thus, contents not described in detail here may be referred to foregoing descriptions at corresponding positions, which are not described in detail herein.

It should be understood that although functional configuration examples of the electronic apparatuses at the control node end and at the to-be-verified node end according to the embodiments of the present disclosure have been described above with reference to FIGS. 3 and 4, these are only exemplary and are not intended for limitation. Additions, deletions, combinations, sub-combinations and modifications can be further made to the above function modules by those skilled in the art as required in actual implementations.

Figure 5:
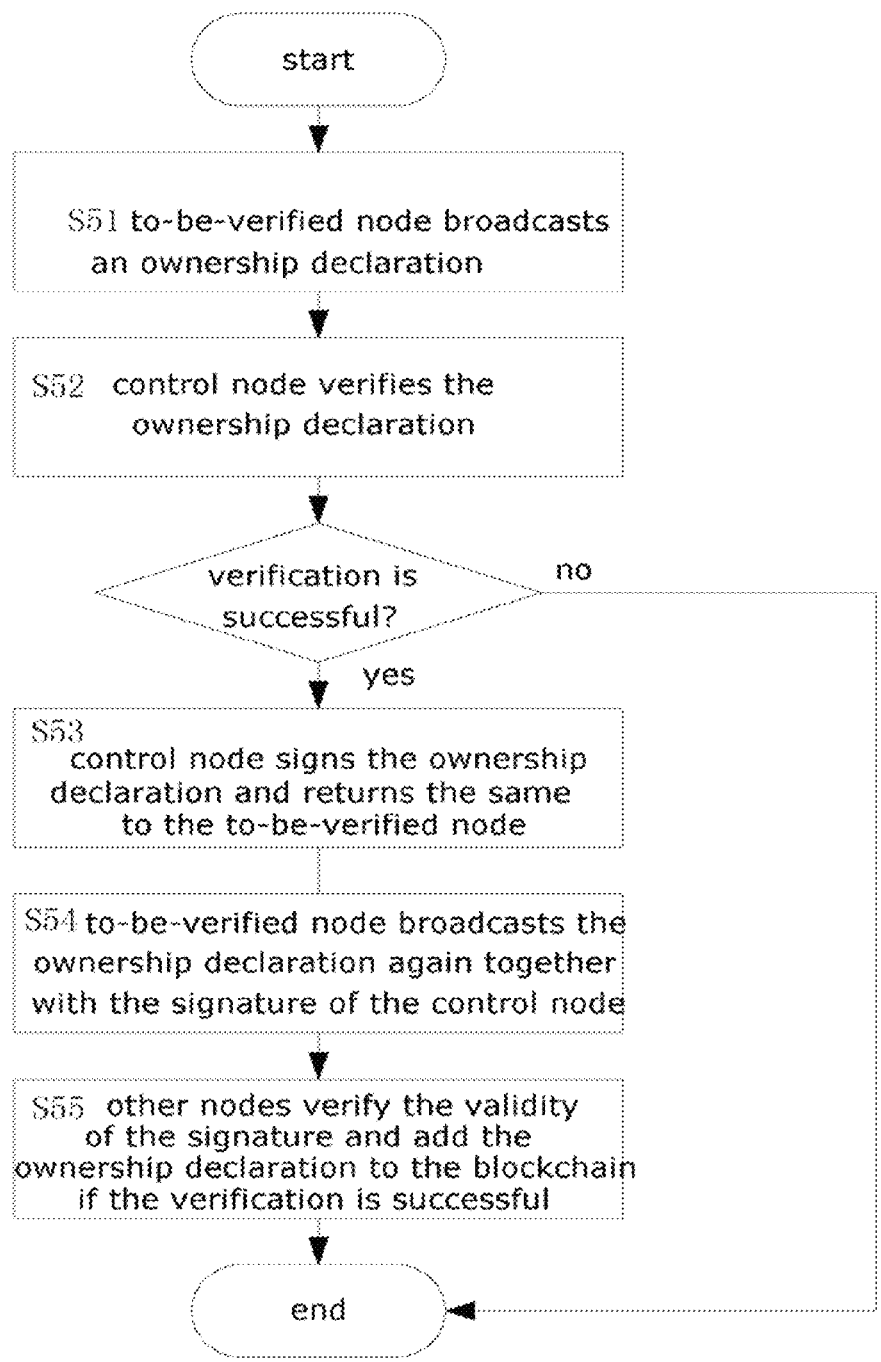
FIG. 5 is a flowchart showing an example procedure for verifying an ownership declaration according to an embodiment of the present disclosure.

In order to further facilitate understanding of an operation procedure of the technology according to the present disclosure, an example procedure for verifying an initial ownership declaration according to an embodiment of the present disclosure is described below with reference to FIG. 5. FIG. 5 is a flowchart showing an example procedure for verifying an ownership declaration according to an embodiment of the present disclosure.

As shown in FIG. 5, first, in step S51, the to-be-verified node broadcasts an ownership declaration for an object that is first introduced in the system, and the declaration may be attached with a signature of the to-be-verified node.

In step S52, the control node verifies the ownership declaration and the signature of the to-be-verified node. A specific way of verifying the ownership declaration and the signature may include but is not limited to the above manner of utilizing the external database or the zero-knowledge proof protocol, which is not described repeatedly herein.

If the verification fails, the process ends, and if the verification succeeds, in step S53, the control node signs the ownership declaration and returns the same to the to-be-verified node.

In step S54, the to-be-verified node broadcasts the ownership declaration again, attached with the signature of the control node, to prove that the to-be-verified node does possess the ownership.

Next, in step S55, all of the nodes in the system verify the signature of the control node, and add a record related to the ownership declaration to a next new block if the verification succeeds. Then the verification procedure ends.

It can be seen that, in the embodiments of the present disclosure, other nodes reach a consensus on the ownership declaration of the to-be-verified node by verifying the validity of the signature of the control node. That is to say, the signature of the control node serves as a guarantee. Since the control node has other additional verifying functions, the signature of the control node may indicate the control node has verified the ownership of the to-be-verified node is authentic and valid. Thus, other nodes in the system can reach a consensus after verifying the signature of the control node, so as to include a record related to the ownership in a block to be generated next, thereby adding the record to the blockchain.

According to the above embodiments of the present disclosure, after the ownership for the new object that is first introduced is registered in the blockchain, it can be traced back to an initial record of the ownership when a transaction related to the ownership such as ownership assignment, ownership transaction and the like is subsequently executed, since the authenticity and reliability of the initial record can be ensured. Therefore, validity and unchangeability of all records in the blockchain can be ensured as the Bitcoin blockchain-based system.

After the record related to the ownership is initially registered in the blockchain, the ownership can be assigned, transacted and the like among all of the nodes (including the control node and the to-be-verified node described above) in the blockchain-based system. For example, the ownership can be transferred from one account address to another account address. Specifically, a user may transfer his/her certain ownership to other users using a certain client node. The transferring operation may be performed with a user account (such as a wallet address or the like), or may be performed with an address generated based on an identity key corresponding to a client if the user is bound with the client. A record of this operation may include at least content of the ownership, identity information of a receiver (such as the account address or the like), signature information of the initiator account and the like. The initiating node records the transferring operation recorded in the blockchain-based system to broadcast, and all of the nodes in the system may participate in information confirmation and generation of a new block. In a case where a new block containing the transferring record is added to the blockchain, it indicates that the ownership is transferred successfully. The record is recorded in the blockchain permanently and can not be modified or deleted.

Figure 6:
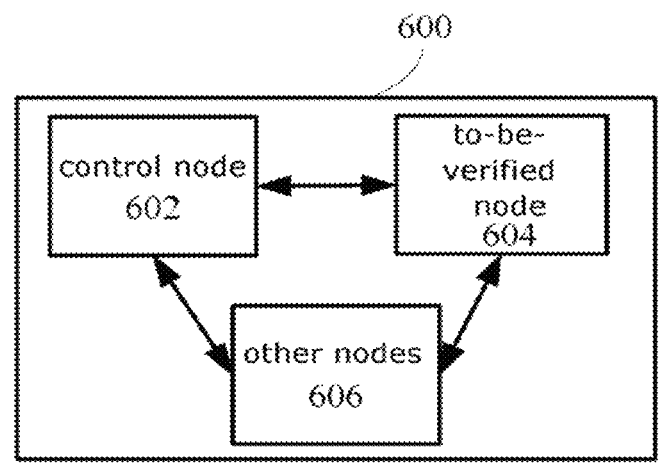
FIG. 6 is a block diagram showing a configuration example of a blockchain-based system according to an embodiment of the present disclosure.

FIG. 6 is a block diagram showing a configuration example of a blockchain-based system according to an embodiment of the present disclosure.

As shown in FIG. 6, a system 600 according to the embodiment may include a control node 602, a to-be-verified node 604 and other nodes 606. The control node 602 and the to-be-verified node 604 can respectively correspond to the embodiments described with reference to FIGS. 3 and 4, and are not described repeatedly here. The number of the control nodes 602 may be one or more.

It should be understood that, the three types of nodes here are classified according to only functions performed when it needs to initially verify an ownership declaration, and are equal in terms of function and status during ordinary running and maintaining of the blockchain, with no such functional differences.

The system 600 may be based on a P2P architecture such as an architecture shown in FIG. 2, in which a P2P system, a hybrid P2P system and a P2P system having super node structure are combined.

Corresponding to the above apparatus embodiments, the present disclosure further provides the following method embodiments.

Figure 7:
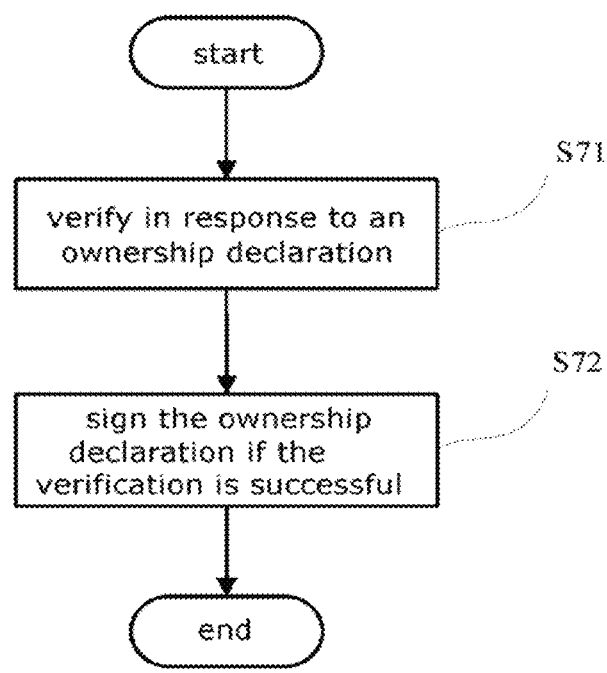
FIG. 7 is a flowchart showing a procedure example of a method in a control node of a blockchain-based system according to an embodiment of the present disclosure.

FIG. 7 is a flowchart showing a procedure example of a method in a control node in a blockchain-based system according to an embodiment of the present disclosure.

As shown in FIG. 7, the method starts at step S71. In step S71, the control node verifies, in response to an ownership declaration for a new object that is first introduced from a to-be-verified node on, the ownership declaration. The specific verification procedure may be referred to the foregoing descriptions at corresponding positions in the apparatus embodiments, and is not repeated here anymore.

Then, the method proceeds to step S72. In Step S72, in a case that the verification is successful, the control node signs the ownership declaration and returns the same to the to-be-verified node to be verified by other nodes in the system, thus a record related to the ownership declaration is added to the blockchain.

Figure 8:
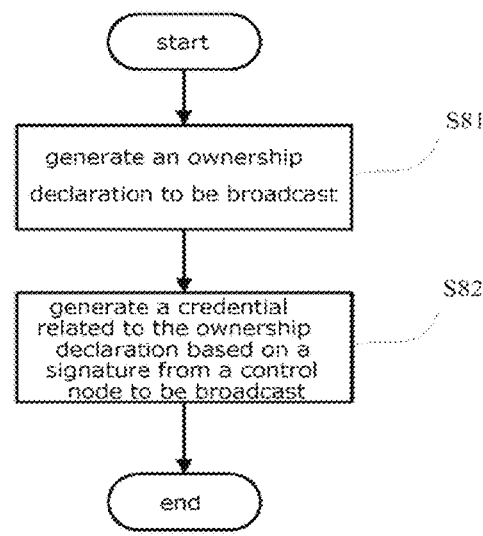
FIG. 8 is a flowchart showing a procedure example of a method in a to-be-verified node of a blockchain-based system according to an embodiment of the present disclosure.

FIG. 8 is a flowchart showing a procedure example of a method in a blockchain-based system according to another embodiment of the present disclosure. The method may be performed by the to-be-verified node.

As shown in FIG. 8, the method starts at step S81. In step S81, the to-be-verified node generates an ownership declaration for a new object that is first introduced, and broadcasts the ownership declaration in the system so as to be verified by a control node. Preferably, the ownership declaration may be attached with a signature of the to-be-verified node.

Then the method proceeds to step S82. In step S82, the to-be-verified node generates a credential related to the ownership declaration based on a signature of the control node and broadcasts the credential in the system, so that other nodes in the system verify the credential and add a record related to the ownership declaration to a blockchain if the verification succeeds.

It should be understood that, the method embodiments described with reference to FIGS. 7 and 8 respectively correspond to the apparatus embodiments described with reference to FIGS. 3 and 4. Therefore, contents not described in detail here may be referred to foregoing descriptions at corresponding positions, and are not repeated here anymore.

In addition, it should be noted that, although the procedure examples of methods according to the embodiments of the present disclosure have been described above, these are only exemplary and are not intended for limitation. Modifications can be made to the above embodiments by those skilled in the art according to the principle of the present disclosure, for example, additions, deletions, combinations or the like may be made to the steps in the embodiments, and all of these modifications fall within the scope of the present disclosure.

It should be understood that machine executable instructions in a storage medium and a program product according to an embodiment of the present disclosure may be also configured to perform the methods corresponding to the apparatus embodiments, and hence the contents which are not described in detail here may be referred to corresponding descriptions above, and are not repeated here.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Furthermore, it shall be noted that the foregoing series of processes and devices can also be embodied in software and/or firmware. In the case of being embodied in software and/or firmware, a program constituting the software is installed from a storage medium or a network to a computer with a dedicated hardware structure, e.g., a general purpose personal computer 900 illustrated in FIG. 9, which can perform various functions when various programs are installed thereon.

Figure 9:
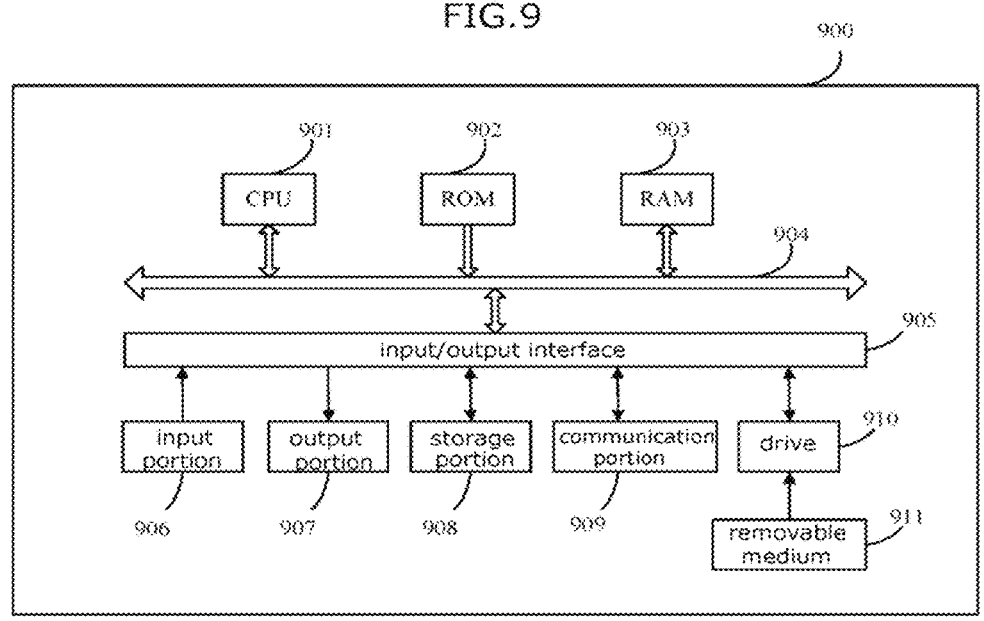
FIG. 9 is a block diagram showing an example structure of a personal computer serving as an information processing apparatus that may be utilized in an embodiment of the present disclosure.

In FIG. 9, a Central Processing Unit (CPU) 901 performs various processes according to a program stored in a Read Only Memory (ROM) 902 or loaded from a storage portion 908 into a Random Access Memory (RAM) 903 in which data required when the CPU 901 performs the various processes is also stored as needed.

The CPU 901, the ROM 902 and the RAM 903 are connected to each other via a bus 904 to which an input/output interface 905 is also connected.

The following components are connected to the input/output interface 905: an input portion 906 including a keyboard, a mouse, etc.; an output portion 907 including a display, e.g., a Cathode Ray Tube (CRT), a Liquid Crystal Display (LCD), etc., a speaker, etc.; a storage portion 908 including a hard disk, etc.; and a communication portion 909 including a network interface card, e.g., an LAN card, a modem, etc. The communication portion 909 performs a communication process over a network, e.g., the Internet.

A drive 910 is also connected to the input/output interface 905 as needed. A removable medium 911, e.g., a magnetic disk, an optical disk, an magneto optical disk, a semiconductor memory, etc., can be installed on the drive 910 as needed so that a computer program fetched therefrom can be installed into the storage portion 908 as needed.

In the case that the foregoing series of processes are performed in software, a program constituting the software is installed from a network, e.g., the Internet, etc., or a storage medium, e.g., the removable medium 911, etc.

Those skilled in the art shall appreciate that such a storage medium will not be limited to the removable medium 911 illustrated in FIG. 9 in which the program is stored and which is distributed separately from the apparatus to provide a user with the program. Examples of the removable medium 911 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 902, a hard disk included in the storage portion 908, etc., in which the program is stored and which is distributed together with the apparatus including the same to the user.

INDUSTRIAL APPLICABILITY

The technology according to the present disclosure may be widely applied to various blockchain-based systems. For example, application examples include but are not limited to an intelligent asset application, an intelligent education blockchain system and a digital wallet.

In the intelligent asset application, a user may declare a certain ownership while ensuring privacy. The control node verifies the ownership declaration of the user according to the zero-knowledge proof. If the verification is successful, an operation such as asset transfer and asset transaction may be performed on the intelligent asset on a blockchain application platform.

In the intelligent education blockchain system, a user may declare an ownership for a certain skill or a certain achievement, without leaking the technology itself of the skill or the achievement for confidentiality. Thus, the control node may verify the ownership of the user according to the zero-knowledge proof. If the verification succeeds, the user can assign the skill or achievement or provide a paid service based on the skill or achievement on a blockchain application platform.

In the digital wallet, a user declares he/she has payment ability but does not want the other party of the transaction to see content in the account (wallet). In this case, the control node may verify the payment ability of the user according to the zero-knowledge proof. If the verification succeeds, the user may perform the transaction with the other party. That is, the signature of the control node can be considered as a guarantee.

In the above, some application examples of the technology according to the present disclosure are given. However, it is obvious the present disclosure is not limited thereto, and may be further applied to various fields such as qualification certification, educational qualification certification and the like, to verify authenticity and validity of an object that is first introduced in the blockchain-based system without relying on the cipher coin.

The above series of processing steps can naturally but not necessarily be performed in the sequential order as described above chronically, and some of the steps can be performed in parallel or independently from each other.

For example, multiple functions included in one unit in the above embodiments may be implemented by separate devices. Alternatively, multiple functions implemented by multiple units in the above embodiments may be implemented by separate devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

Although the disclosure and the advantages thereof have been described in details, it shall be appreciated that various modifications, substitutions and variations can be made without departing from the spirit and scope of the disclosure as defined by the appended claims. Furthermore, the terms "include", "comprise" or any variants thereof in the embodiments of the disclosure are intended to encompass nonexclusive inclusion so that a process, method, article or apparatus including a series of elements includes both those elements and other elements which are not listed explicitly or an element(s) inherent to the process, method, article or apparatus. Without much more limitation, an element being defined by a sentence "include/comprise a(n) . . . " will not exclude presence of an additional identical element(s) in the process, method, article or apparatus including the element.

The invention claimed is:

1. An electronic apparatus at a control node end in a blockchain-based system, the electronic apparatus comprising a processor, said processor configured to:
    verify, in response to an ownership declaration for a first introduced object from a to-be-verified node, the ownership declaration in the system; and
    sign the ownership declaration to be returned to the to-be-verified node when the verification is successful, so that the signed ownership declaration is verified by other nodes in the system and a record regarding the ownership declaration is added to the blockchain, wherein
    the processor is further configured to verify the ownership declaration using an external database that comprises one or more of a centralized data service platform, a cloud computing platform and other blockchain platforms.

2. The electronic apparatus according to claim 1, wherein the processor is further configured to verify the ownership declaration according to a zero-knowledge proof protocol.

3. The electronic apparatus according to claim 2, wherein the processor is further configured to verify, based on an identifier in the ownership declaration, the ownership declaration according to the zero-knowledge proof protocol.

4. The electronic apparatus according to claim 1, wherein the processor is further configured to verify a signature of the to-be-verified node, and sign the ownership declaration when the verification is successful.

5. The electronic apparatus according to claim 1, wherein the electronic apparatus operates as the control node and further comprises:
    a communication unit configured to perform data transmission and reception operations.

6. An electronic apparatus at a to-be-verified node end in a blockchain-based system, the electronic apparatus comprising a processor, said processor configured to:
    generate an ownership declaration for a first introduced new object to be broadcast in the system and verified by a control node in the system using an external database that comprises one or more of a centralized data service platform, a cloud computing platform and other blockchain platforms; and
    generate, based on a signature from the control node made after the control node verified ownership declaration, a credential regarding the ownership declaration to be broadcast in the system, so that the credential is verified by other nodes in the system and a record regarding the ownership declaration is added to the blockchain.

7. The electronic apparatus according to claim 6, wherein the processor is further configured to set an identifier in the ownership declaration to indicate that the ownership declaration requires privacy protection.

8. The electronic apparatus according to claim 7, wherein the processor is further configured to interact, in response to a zero-knowledge proof protocol initiated by the control node based on the identifier, with the control node for verifying the ownership declaration.

9. The electronic apparatus according to claim 6, wherein the processor is further configured to generate a signature of the electronic apparatus to be broadcast, so that the signature is verified by the control node.

10. The electronic apparatus according to claim 6, wherein the electronic apparatus operates as the to-be-verified node and further comprises:
    a communication unit configured to perform data transmission and reception operations.

11. A blockchain-based system, comprising:
    a to-be-verified node configured to: generate an ownership declaration for a first introduced new object to be broadcast in the system, and generate, based on a signature from a control node, a credential regarding the ownership declaration to be broadcast in the system;
    the control node configured to: verify the ownership declaration using an external database that comprises one or more of a centralized data service platform, a cloud computing platform and other blockchain platforms in response to the ownership declaration, and sign the ownership declaration to be returned to the to-be-verified node when the verification is successful; and
    other nodes configured to verify the credential in response to the credential broadcast by the to-be-verified node, so that a record regarding the ownership declaration is added to the blockchain.

12. The system according to claim 11, wherein the number of the control node is one or more.

13. The system according to claim 11, wherein the system is based on a peer-to-peer architecture.

\* \* \* \* \*